ic acid as an element of the compound not only
UNITED STATES PATENT OFFICE.

WILLIAM A. HALL, OF BELLOWS FALLS, VERMONT.

SIZING.

SPECIFICATION forming part of Letters Patent No. 623,541, dated April 25, 1899.

Application filed April 23, 1897. Renewed November 12, 1898. Serial No. 696,317. (No specimens.)

*To all whom it may concern:*

Be it known that I, WILLIAM A. HALL, a citizen of the United States, residing at Bellows Falls, in the county of Windham and State of Vermont, have invented certain new and useful Improvements in Sizing; and I do hereby declare the following to be a full, clear, and exact description of the invention, such as will enable others skilled in the art to which it appertains to make and use the same.

My invention has for its object the production of an improved sizing which can be prepared so as to be commercial in the form of a powder and which is readily soluble in hot or cold water. The ingredient from which the sizing properties of the compound which I shall describe in detail hereinafter are derived is casein or milk albumen. This element has long been known to possess the qualities essential for sizing purposes; but difficulties have arisen in its use which cause more or less dissatisfaction and preclude the general adoption of sizing compounds which are dependent on this ingredient for their glutinous property.

I conceive that the chief objection to casein sizes as now known and used is the danger of precipitation of the curd and the formation of an insoluble mass when an agent (alum or a suitable acid) to neutralize the alkali generally used to cut the casein powder in dissolving is added to the casein solution. I have discovered that the use of boracic acid will completely neutralize the alkali used in cutting and dissolving the casein powder, and this without any precipitation of the curd or indications of the formation of an insoluble mass.

In carrying my invention into practice I generally employ the casein or milk albumen in the form of a dry powder, this powder being preferably free from calcium phosphates, ($CaPo_4$,) and, furthermore, alkaline in its composition, an alkali being employed to cut and dissolve the casein. To the above composition I add boracic acid in varying proportions in accordance with the degree of solubility desired and the amount of alkali used. The effect of the addition of the boracic acid is to neutralize the alkali without precipitating the curd in an insoluble mass and increase the solubility of the curd. The addition of four or five per cent. of boracic acid to the casein solution renders the curd more soluble and gives a perfectly neutral solution, while the introduction of larger proportions of boracic acid gives the size an acid reaction and makes it very soluble. By the practice of my invention as outlined above I am able to produce a neutral and strongly-acid size, but one which at the same time is so soluble as to readily dissolve in cold water. A further advantage of the use of boracic acid lies in the fact that it is a good preservative, and sizing prepared in accordance with the method invented by me will remain in a pure untainted condition much longer than that prepared without the boracic acid.

Another objection to casein sizing as heretofore known to me was that when the size was subjected to heat in dissolving it for use the size became darkened, and in event of the size being permitted to stand after mixing, whether heated or not, the same difficulty arose. I find that the use of boracic acid as an element of the compound not only permits the mixture to be raised to a high temperature, but also allows it to stand after mixing without showing any of the objectionable darkening to which the size as heretofore compounded has been liable.

When a mineral substance, as clay, is used as a base for the size, the boracic acid has the effect of keeping the mineral substance in suspension and prevents it settling, thus enabling the liquid to be applied more readily, since it seems to flow better, somewhat after the manner of an oil-paint.

In producing the size which I have described above in commercial form I preferably take one hundred pounds of casein curd, (in the form of powder,) ten to twenty parts alkali, the amount of this ingredient varying somewhat according to its strength, and one-half to five parts boracic acid, the proportion of boracic acid being changed according to whether it is desired to obtain a solution which is alkaline, neutral, or acid. A practical method of placing this sizing upon the market is to grind up the casein, alkali, and boracic acid together in the proper proportions and then ship the composition in a dry powdered state to the consumers. It can be readily dissolved by the user, as desired, without further treatment on his part beyond the mere mechanical act of dissolving, since the elements necessary to produce the chemical action required are all contained in the composition.

Having thus described my invention, I claim and desire to secure by Letters Patent—

1. A sizing consisting of casein or milk albumen, an alkali, and boracic acid, as specified.

2. A sizing consisting of an acid curd or one free from calcium phosphates, an alkali, and boracic acid, as explained.

3. A liquid composed of a mineral base, casein or milk albumen, an alkali and boracic acid in the proportions as herein described.

In testimony whereof I affix my signature in presence of two witnesses.

WILLIAM A. HALL.

Witnesses:
 JAS. E. MYERS,
 FRED W. BURBANK.